US012619917B2

(12) United States Patent (10) Patent No.: US 12,619,917 B2
De et al. (45) Date of Patent: May 5, 2026

(54) FEATURE CONTRIBUTION COMPUTATION AND HUMAN-INTERPRETABLE REASON CODES FOR A SUPPORT VECTOR MACHINE

(71) Applicant: ACCENTURE GLOBAL SOLUTIONS LIMITED, Dublin (IE)

(72) Inventors: Tanusree De, Bangalore (IN); Padma Murali, Chennai (IN); Subhadip Ghosh, West Bengal (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 867 days.

(21) Appl. No.: 17/967,709

(22) Filed: Oct. 17, 2022

(65) Prior Publication Data

US 2024/0135260 A1 Apr. 25, 2024

(51) Int. Cl.
*G06N 20/10* (2019.01)
(52) U.S. Cl.
CPC ..................................... *G06N 20/10* (2019.01)
(58) Field of Classification Search
CPC ...................................................... G06N 20/10
See application file for complete search history.

(56) References Cited

U.S. PATENT DOCUMENTS

2019/0244122 A1 8/2019 Li et al.
2021/0142169 A1 5/2021 De et al.

OTHER PUBLICATIONS

Chen et al. "Generating Hierarchical Explanations on Text Classification via Feature Interaction Detection", arXiv:2004.02015v3 [cs.CL] May 18, 2020, pp. 16.*
Nunez et al. "Rule extraction from support vector machine", ESANN 2002, pp. 6.*
De et al., "An Explainable AI powered Early Warning System to address Patient Readmission Risk", 2021 IEEE National Biomedical Engineering Conference (NBEC), 2021, pp. 42-47.
De et al., "Explainable AI: A Hybrid Approach to Generate Human-InterpretableExplanation for Deep Learning Prediction", Procedia Computer Science 168 (2020) 40-48.

* cited by examiner

*Primary Examiner* — Li Wu Chang
(74) *Attorney, Agent, or Firm* — Mannava & Kang, P.C.

(57) ABSTRACT

Systems and methods for computing feature contribution and providing hum-interpretable reason codes for a Support Vector Machine (SVM) model are disclosed, A system computes, for each data point from amongst plurality of data points indicative of plurality of features, a feature contribution of each one of the plurality of features for a SVM model used for at least one of classification decision and a regression analysis. Further, the system provides human interpretable reason code for the interpretation corresponding to at least one of classification decision and the regression analysis from the SVM model. The system outputs to the user, a feature contribution output, and the human interpretable reason codes output. The feature contribution output and the human interpretable reason codes output are indicative of an acceptable decision to be taken by the user based on the classification decision and the regression analysis received from the SVM model.

20 Claims, 10 Drawing Sheets

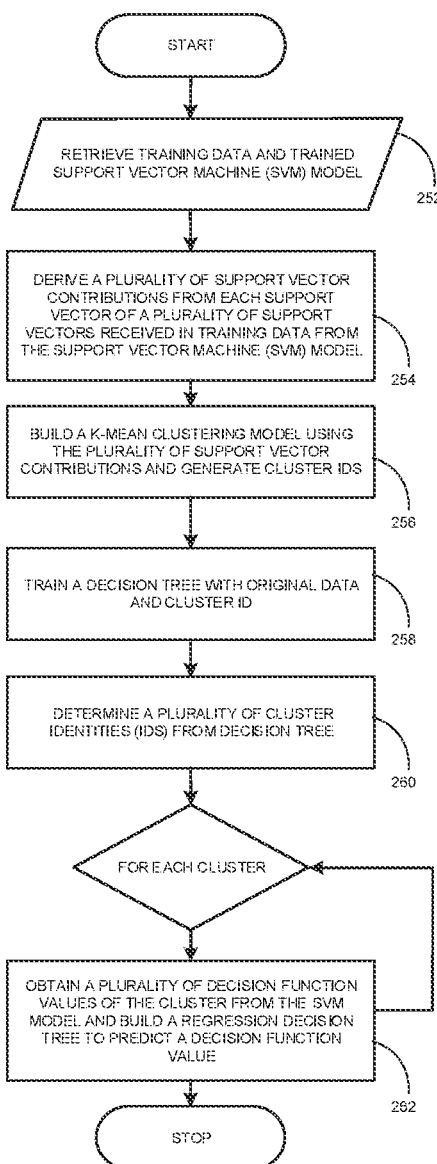

START

RETRIEVE TRAINING DATA AND TRAINED
SUPPORT VECTOR MACHINE (SVM) MODEL
252

DERIVE A PLURALITY OF SUPPORT VECTOR
CONTRIBUTIONS FROM EACH SUPPORT
VECTOR OF A PLURALITY OF SUPPORT
VECTORS RECEIVED IN TRAINING DATA FROM
THE SUPPORT VECTOR MACHINE (SVM) MODEL
254

BUILD A K-MEAN CLUSTERING MODEL USING
THE PLURALITY OF SUPPORT VECTOR
CONTRIBUTIONS AND GENERATE CLUSTER IDS
256

TRAIN A DECISION TREE WITH ORIGINAL DATA
AND CLUSTER ID
258

DETERMINE A PLURALITY OF CLUSTER
IDENTITIES (IDS) FROM DECISION TREE
260

FOR EACH CLUSTER

OBTAIN A PLURALITY OF DECISION FUNCTION
VALUES OF THE CLUSTER FROM THE SVM
MODEL AND BUILD A REGRESSION DECISION
TREE TO PREDICT A DECISION FUNCTION
VALUE
262

STOP

FIG. 2D

START

LOAD TEST DATA AND CLUSTER THE TEST DATA WITHIN CLUSTER DECISION TREES MODEL — 272

INPUT THE TEST DATA TO THE CLUSTERING DECISION TREE MODEL AND GENERATE THE PLURALITY OF CLUSTER IDS WITH REASON CODES — 274

OBTAIN DECISION VALUE AND REASON CODE FROM THE CLUSTER DECISION TREE — 276

IF DECISION

YES — PREDICT 1 — 278

NO — PREDICT 0 — 280

STOP

FEATURE CONTRIBUTION COMPUTATION AND HUMAN-INTERPRETABLE REASON CODES FOR A SUPPORT VECTOR MACHINE

BACKGROUND

Generally, machine learning-based classification algorithms such as a Support Vector Machine (SVM), and the like are supervised machine learning algorithms used for both classification and regression tasks. The SVM algorithm may have some shortcomings. For example, it may be difficult to interpret the SVM model used by the SVM classifier to make classification decisions. Interpreting the SVM models helps in understanding the features in the data set that contribute (i.e., feature contribution) statistically and/or significantly to the SVM classifier decision. The feature contribution provides a coefficient for every feature and the coefficient provides information as to which set of features contributes the most to a target variable.

Conventional methods for determining feature contribution may use a SHapley Additive exPlanation (SHAP) algorithm, a Local Interpretable Model-agnostic Explanations (LIME) algorithm, and the like. These algorithms may not consider complex mathematical decisions in the SVM model and may provide model-agnostic feature contributions and not model-specific feature contributions.

Additionally, in most real-time applications, an Artificial Intelligence (AI) model (e.g., the SVM model) may be an integral part of the decision-making process. However, to trust a prediction from the AI model or to perform a downstream workflow action based on it, one needs to understand one or more reasons for the prediction from the AI model. A user may appreciate or even accept the prediction given by the AI model if, the AI model can explain the logical steps and reasoning used to arrive at that prediction. Conventional methods for explaining reasons may use the LIME algorithm and the SHAP algorithm (i.e., based on game theory which computes SHAPley values). The LIME algorithm may provide local explanations and SHAP algorithm may provide global and local explanations. However, the explanations provided by such algorithms may not be easily understood by a user. Further, the SHAP algorithm is computation-intensive due to the usage of the SHAPley values thereby resulting in an exponential running time.

Furthermore, existing systems and methods provide for an AI-based explanation of the reasoning for deconstructing a real-world problem, and generating a machine reasoning that may be model-agnostic and not model-specific. Additionally, the explanations generated by the conventional methods may not be easily understood by users as the reason codes which are generated may not be in a human interpretable form.

Therefore, there is a need for systems and methods for addressing at least the above-mentioned problems in the existing approaches for determining feature contributions and providing user interpretable reason codes.

SUMMARY

An embodiment of present disclosure includes a system, the system computes, for each data point from amongst a plurality of data points indicative of a plurality of features, a feature contribution of each one of the plurality of features for a Support Vector Machine (SVM) model used for at least one of a classification decision and a regression analysis. Further, the system provides at least one human interpretable reason code for the interpretation corresponding to at least one of the classification decision and the regression analysis from the SVM model.

Further, for computing feature contribution, the system derives, for each data point, a plurality of support vector contributions from each support vector of a plurality of support vectors received from training data from the Support Vector Machine (SVM) model. The system allocates, for each support vector, the derived plurality of support vector contributions to the plurality of features in the training data. Furthermore, the system determines, for each data point, a plurality of feature contributions by summing the plurality of support vector contributions of each feature. The plurality of features influences the contribution of the plurality of support vector contributions. Further, the system generates a feature contribution output based on the plurality of feature contributions associated with the classification decision and the regression analysis.

Furthermore, for providing the plurality of human interpretable reason codes, the system generates a support vector contribution table based on the plurality of support vector contributions. The system clusters the support vector contribution table for grouping similarly trained data points in the training data into one cluster. Further, the system determines a plurality of cluster Identities (IDs) from the clustered support vector contribution table. Furthermore, the system builds at least one of, a trepan tree or a decision tree using original data and the plurality of cluster IDs. The system generates a cluster explanation for each cluster ID of the plurality of cluster IDs, based on the interpretation corresponding to at least one of the classification decision and the regression analysis received from the SVM model. Further, the system generates the human interpretable reason codes output, based on the cluster explanation for each cluster-ID.

Furthermore, the system outputs to the user, the feature contribution output, and the human interpretable reason codes output. The feature contribution output and the human interpretable reason codes output are indicative of acceptable decision to be taken by the user based on the classification decision and the regression analysis received from the SVM model Another embodiment of the present disclosure may include a method, the method includes computing, for each data point from amongst a plurality of data points indicative of a plurality of features, a feature contribution of each one of the plurality of features for a Support Vector Machine (SVM) model used for at least one of a classification decision and a regression analysis. Further, the method includes providing at least one human interpretable reason code for the interpretation corresponding to at least one of, the classification decision and the regression analysis from the SVM model.

Further, for computing contribution, the method includes deriving, for each data point, a plurality of support vector contributions from each support vector of a plurality of support vectors received from training data from the Support Vector Machine (SVM) model. The method includes allocating for each support vector, the derived plurality of support vector contributions to the plurality of features in the training data. Further, the method includes determining for each data point, a plurality of feature contributions by summing the plurality of support vector contributions of each feature. The plurality of features influences the contribution of the plurality of support vector contributions. Furthermore, the method includes generating a feature contribution output based on the plurality of feature contributions associated with the classification decision and the regression analysis.

Further, for providing the plurality of human interpretable reason codes, the method includes generating a support vector contribution table based on the plurality of support vector contributions. Further, the method includes clustering the support vector contribution table for grouping similarly trained data points in the training data into one cluster. Furthermore, the method includes determining a plurality of cluster Identities (IDs) from the clustered support vector contribution table. Further, the method includes building at least one of, a trepan tree or a decision tree using original data and the plurality of cluster IDs. The method includes generating a cluster explanation for each cluster ID of the plurality of cluster IDs, based on the interpretation corresponding to at least one of, the classification decision and the regression analysis received from the SVM model. Further, the method includes generating the human interpretable reason codes output, based on the cluster explanation for each cluster-ID.

Furthermore, the method includes outputting to the user, the feature contribution output, and the human interpretable reason codes output. The feature contribution output and the human interpretable reason codes output are indicative of acceptable decision to be taken by the user based on the classification decision and the regression analysis received from the SVM model.

Yet another embodiment of the present disclosure may include a non-transitory computer-readable medium comprising machine-executable instructions that may be executable by a processor to compute, for each data point from amongst a plurality of data points indicative of a plurality of features, a feature contribution of each one of the plurality of features for a Support Vector Machine (SVM) model used for at least one of a classification decision and a rearession analysis. Further, the processor provides at least one human interpretable reason code for the interpretation corresponding to at least one of, the classification decision and the regression analysis from the SVM model.

Further, for computing feature contribution, the processor derives, for each data point, a plurality of support vector contributions from each support vector of a plurality of support vectors received from training data from the Support Vector Machine (SVM) model. The processor allocates, for each support vector, the derived plurality of support vector contributions to the plurality of features in the training data. Furthermore, the processor determines, for each data point, a plurality of feature contributions by summing the plurality of support vector contributions of each feature. The plurality of features influences the contribution of the plurality of support vector contributions. Further, the processor generates a feature contribution output based on the plurality of feature contributions associated with the classification decision and the regression analysis.

Furthermore, for providing the plurality of human interpretable reason codes, the processor generates a support vector contribution table based on the plurality of support vector contributions. The processor clusters the support vector contribution table for grouping similarly trained data points in the training data into one cluster. Further, the processor determines a plurality of cluster Identities (IDs) from the clustered support vector contribution table. Furthermore, the processor builds at least one of, a trepan tree or a decision tree using original data and the plurality of cluster IDs. The processor generates a cluster explanation for each cluster ID of the plurality of cluster IDs, based on the interpretation corresponding to at least one of, the classification decision and the regression analysis received from the SVM model. Further, the processor generates the human interpretable reason codes output, based on the cluster explanation for each cluster-ID.

Furthermore, the processor outputs to the user, the feature contribution output, and the human interpretable reason codes output. The feature contribution output and the human interpretable reason codes output are indicative of acceptable decision to be taken by the user based on the classification decision and the regression analysis received from the SVM model.

BRIEF DESCRIPTION OF DRAWINGS

FIG. 2D illustrates an example flow diagram of a method for providing human-interpretable reason codes using a decision tree for Support Vector Machine (SVM), according to an example embodiment of the present disclosure.

DETAILED DESCRIPTION

Figure 1:
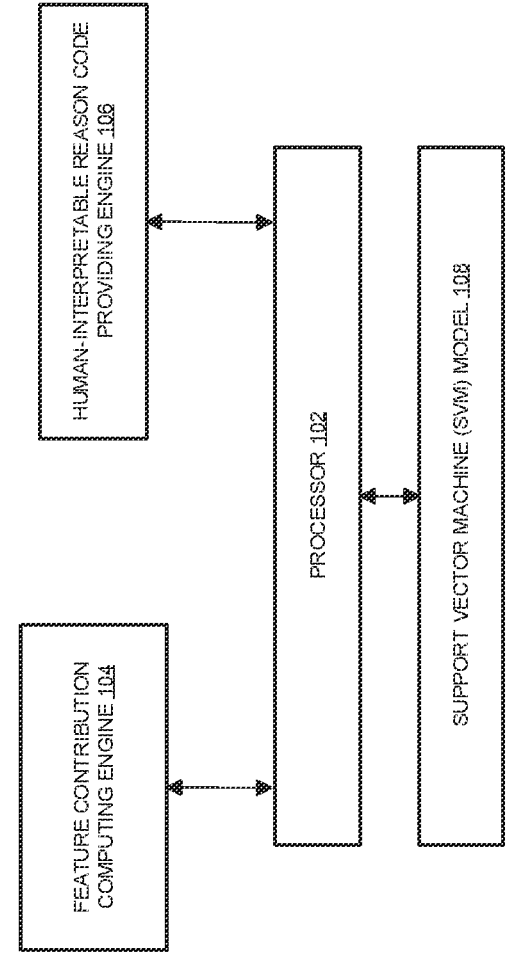
FIG. 1 illustrates a system for computing feature contribution and providing human-interpretable reason codes for a Support Vector Machine (SVM), according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one example of a particular element. The terms "a" and "an" may also denote more than one example of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe a system and a method for computing feature contribution and providing human-interpretable reason codes for a Support Vector Machine (SVM). The system computes, for each data point from amongst a plurality of data points indicative of a plurality of features, a feature contribution of each one of the plurality of features for a Support Vector Machine (SVM) model used for at least one of a classification decision and a regression analysis. Further, the system provides at least one human interpretable reason code for the interpretation corresponding to at least one of, the classification decision and the regression analysis from the SVM model.

Specifically, for computing the feature contribution, the system derives, for each data point, a plurality of support vector contributions from each support vector of a plurality of support vectors received from training data from the Support Vector Machine (SVM) model. The system allocates, for each support vector, the derived plurality of support vector contributions to the plurality of features in the training data. Furthermore, the system determines, for each data point, a plurality of feature contributions by summing the plurality of support vector contributions of each feature. The plurality of features influences the contribution of the plurality of support vector contributions. Additionally, the system generates a feature contribution output based on the plurality of feature contributions associated with the classification decision and the regression analysis.

Furthermore, for providing the plurality of human interpretable reason codes, the system generates a support vector contribution table based on the plurality of support vector contributions. The system clusters the support vector contribution table for grouping similarly trained data points in the training data into one cluster. Further, the system determines a plurality of cluster dentities (IDs) from the clustered support vector contribution table. Furthermore, the system builds at least one of, a trepan tree or a decision tree using original data and the plurality of cluster IDs. The system generates a cluster explanation for each cluster ID of the plurality of cluster IDs, based on the interpretation corresponding to at least one of, the classification decision and the regression analysis received from the SVM model. Additionally, the system generates the human interpretable reason codes output, based on the cluster explanation for each cluster-ID. Furthermore, the system outputs to the user, the feature contribution output, and the human interpretable reason codes output. The feature contribution output and the human interpretable reason codes output are indicative of an acceptable decision to be taken by the user based on the classification decision and the regression analysis received from the SVM model.

Embodiments herein may provide model-specific local explanations (i.e., reason codes) which are human interpretable, for predictions from a Support Vector Machine (SVM) machine learning model. Embodiments herein derive reason codes for every individual prediction from the SVM model.

The generated explanations are easily understandable by common users as the reason codes which are generated are in human interpretable form. Embodiments herein can be integrated into the existing asset e.g., an "explainable Artificial Intelligence (AI) services platform" which trains machine learning explanation models and provides predictions with explanations. Further, the embodiments herein may compute model-specific feature contribution for the SVM for every data point.

For example, the embodiments disclosed herein may be used in financial and insurance domains to determine credit risk scores of customers based on multiple parameters. Needless to say, it may be undesirable to refuse a customer's loan request without providing an in-depth explanation on why the loan request is denied. Alternatively, machine learning applications are being used extensively within the field of pharmaceuticals and medicine for drug discovery or detecting diseases. For example, patients may not be pleased with a diagnosis without an explanation of the approach and logic used by the algorithm to arrive at a decision. Additionally, from the perspective of accelerating the pace of machine learning adoption, it may be important that the end users trust machine learning models and individual predictions.

FIG. 1 illustrates a system 100 for computing feature contribution and providing human-interpretable reason codes for a Support Vector Machine (SVM) according to an example embodiment of the present disclosure. The system 100 may be implemented by way of a single device or a combination of multiple devices that may be operatively connected or networked together. The system 100 may be implemented in hardware or a suitable combination of hardware and software. The system 100 includes a processor 102. The system 100 may include a feature contribution computing engine 104, a human-interpretable reason code providing engine 106, and a Support Vector Machine (SVM) model 108.

The system 100 may be a hardware device including the processor 102 executing machine-readable program instructions to compute feature contribution and providing human-interpretable reason codes for a Support Vector Machine (SVM). Execution of the machine-readable program instructions by the processor 102 may enable the proposed system 100 to perform a feature contribution computation and provide human-interpretable reason codes for a support vector machine. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, feature extraction, and/or any other functions. Any reference to a task in the present disclosure may refer to an operation being or that may be performed on data.

In an example embodiment, the processor 102 may execute the feature contribution computing engine 104 to compute, for each data point from amongst a plurality of data points indicative of a plurality of features, a feature contribution of each one of the features for the SVM model 108. The SVM model 108 may be used for at least one of a classification decision and a regression analysis. In an example embodiment, the processor 102 may execute the human-interpretable reason code providing engine 106 to provide at least one human-interpretable reason code for the interpretation corresponding to at least one of, the classification decision and the regression analysis from the SVM model 108.

In an example embodiment, for computing feature contribution, the processor 102 may derive, for each data point, a plurality of support vector contributions from each support vector of a plurality of support vectors received from training data from the Support Vector Machine (SVM) model 108. In an example embodiment, the derived plurality of support vector contributions to the plurality of features in the training data may be allocated, by the processor 102, for each support vector, so that the features comprising a positive weight contribution are provided with higher feature contribution values and the features comprising a negative weight contribution are provided with lower feature contribution values.

In an example embodiment, the processor 102 may allocate, for each support vector, the derived plurality of support vector contributions to the plurality of features in the training data. In an example embodiment, the processor 102 may determine, for each data point, a plurality of feature contributions by summing the plurality of support vector contributions of each feature. In an example embodiment, the plurality of features may influence the contribution of the plurality of support vector contributions. In an example embodiment, the processor 102 may generate a feature contribution output based on the plurality of feature contributions associated with the classification decision and the regression analysis.

In an example embodiment, for providing the plurality of human interpretable reason codes, the processor 102 may generate a support vector contribution table based on the plurality of support vector contributions. In an example embodiment, the processor 102 may cluster the support vector contribution table for grouping similarly trained data points in the training data into one cluster. In an example embodiment, the processor 102 may determine a plurality of cluster Identities (IDs) from the clustered support vector contribution table. The similarly trained data points may be similar feature vectors that provide the same prediction (predict same class) as that of other data points.

In an example embodiment, the processor 102 may build at least one of, a trepan tree or a decision tree using original data and the plurality of cluster IDs. In an example embodiment, the original data may be unscaled training data. In an example embodiment, for budding at least one of, the trepan tree or the decision tree using the original data and the plurality of cluster IDs, the processor 102 may initially generate the plurality of cluster IDs with a reason code associated with each cluster ID. Further, the processor 102 may construct using at least one of, the trepan tree or the decision tree, and a plurality of clusters, based on the plurality of cluster IDs comprising the reason code. In an example embodiment, the processor 102 may analyze, for each cluster, a plurality of distributions in a plurality of classes associated with the plurality of clusters. In an example embodiment, the processor 102 may determine whether a class of the plurality of classes is homogeneous or non-homogenous, when the plurality of clusters is constructed using the trepan tree. In an example embodiment, the processor 102 may obtain, for each cluster, a plurality of decision function values from the SVM model to predict a decision function value using a regression decision tree, when the plurality of clusters is constructed using the decision tree.

In an example embodiment, the processor 102 may associate, when the class of the plurality of classes is homogeneous, the cluster with one class present in the cluster. Further, the processor 102 may build, when the class of the plurality of classes is non-homogeneous, a trepan tree on the cluster associated with the class which is non-homogeneous to generate a class. In an example embodiment, the processor 102 may build, when there are 'n' clusters with 'k' homogeneous clusters, an n-k trepan tree for each non-homogenous cluster, and one trepan tree for constructing the plurality of clusters.

In an example embodiment, the processor 102 may generate a cluster explanation for each cluster ID of the plurality of clusterIDs, based on the interpretation corresponding to at least one of, the classification decision and the regression analysis received from the SVM model 108. In an example embodiment, the interpretation from the SVM model is input, by the processor 102, to the trepan tree to generate the plurality of cluster IDs with reason codes. The plurality of cluster IDs with reason codes are input to the trepan tree to analyze if trepan tree is built for the cluster ID. In an example embodiment, if the trepan tree is not built for the cluster ID, then the reason codes are returned, by the processor 102, as output along with the class IDs. In an example embodiment, if the trepan tree is built for the cluster ID, then the interpretation from the SVM is input, by the processor 102, to the trepan tree associated with the cluster ID to generate, another set of reason codes along with the class ID. In an example embodiment, the interpretation from the SVM model is input, by the processor 102, to the decision tree to generate the plurality of cluster IDs with reason codes. In an example embodiment, the plurality of cluster IDs with reason codes is input to a regression decision tree associated with the cluster-ID to generate another set of reason codes with the class ID.

In an example embodiment, the processor 102 may generate the human interpretable reason codes output, based on the cluster explanation for each cluster ID. In an example embodiment, the processor 102 may output to the user, the feature contribution output, and the human interpretable reason codes output. In an example embodiment, the feature contribution output and the human interpretable reason codes output may be indicative of an acceptable decision to be taken by the user based on the classification decision and the regression analysis received from the SVM model 108.

Figure 2A:
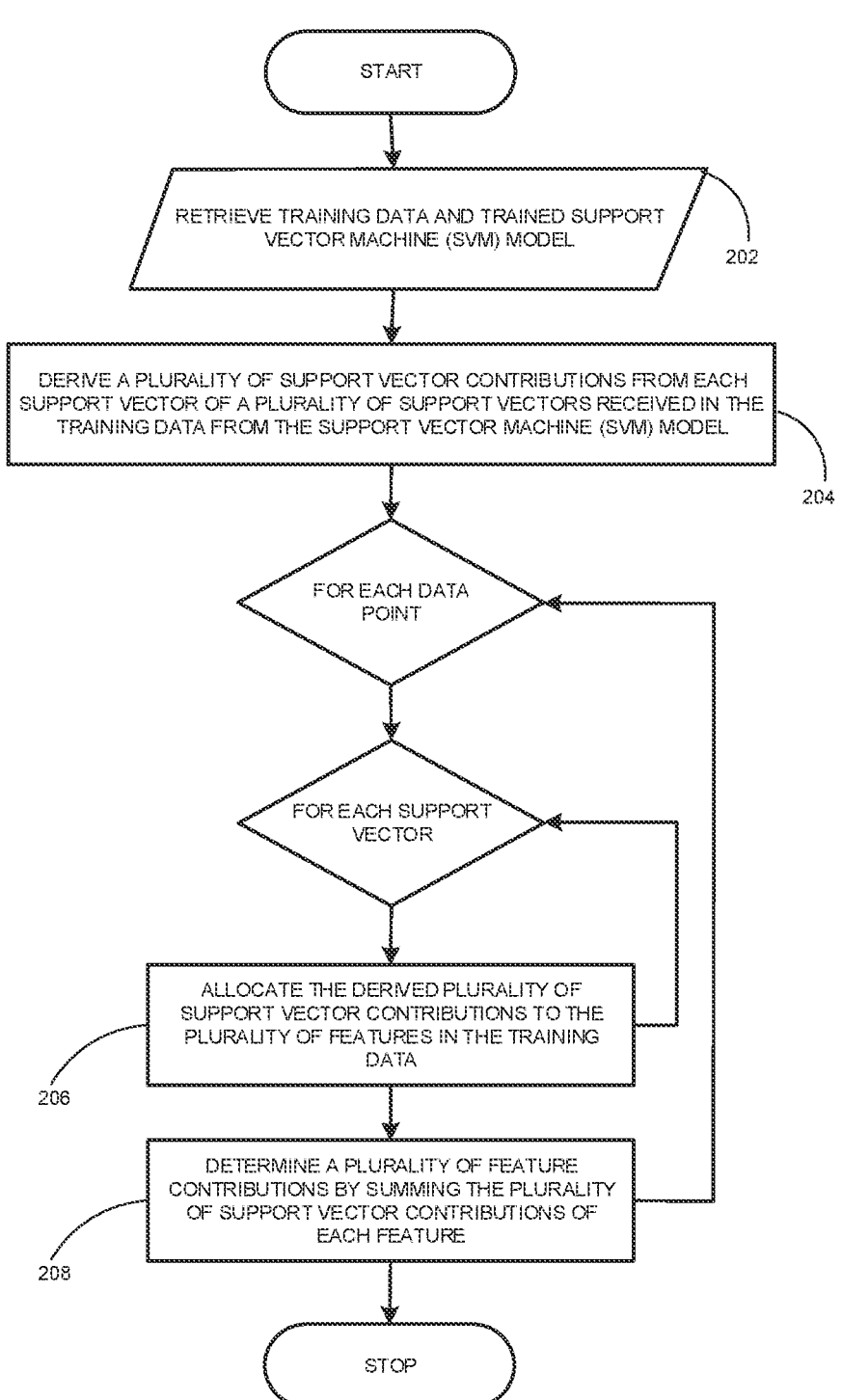
FIG. 2A illustrates an example flow diagram of a method for computing feature contribution for a Support Vector Machine (SVM), according to an example embodiment of the present disclosure.

FIG. 2A illustrates an example flow diagram of a method for computing feature contribution for Support Vector Machine (SVM), according to an example embodiment of the present disclosure.

At step 202, the method includes retrieving training data and a trained Support Vector Machine (SVM) model 108. At step 204, the method includes deriving a plurality of support vector contributions from each support vector of a plurality of support vectors received in the training data from the Support Vector Machine (SVM) model 108. For example, the plurality of support vector contributions from each support vector of the plurality of support vectors may be derived using equation 1 below:

$$g(x_k) = \sum_{i \in S} y_i \alpha_i K(x_i, x_k) + b = \sum_{i \in S} C_k^i + b \qquad \text{Equation 1}$$

Wherein, $$C_k^i = y_i \alpha_i K(x_i, x_k)$$

In the above equation, the variable 'S' denotes a set of support vectors, the variable '$y_i$' denotes a target variable for '$i^{th}$' support vector, the variable '$x_i$' denotes '$i^{th}$' support vector, the variable '$x_k$' denotes '$k^{th}$' data point, '$a_i$' denotes weight of '$i^{th}$' support vector, the variable 'b' denotes bias, the variable 'K' denotes kernel function, and the term $$'C_k^{i\prime}$$

denotes contribution '$i^{th}$' support vector for data point. For example, the kernels may include:

linear: $(x, x')$.

polynomial: $(\mathbf{\tau}(x, x')+r)^d$, where 'd' is specified by parameter degree, '$\mathbf{\tau}$' by coef 0.

rbf: $\exp(-\mathbf{\tau}\|x-x'\|^2)$, where '$\mathbf{\tau}$' is specified by parameter gamma, and may be greater than 0.

sigmoid tanh $(\mathbf{\tau}(x, x')+r)$, where 'r' is specified by coef 0.

At step 206, the method includes allocating, for each support vector, the derived plurality of support vector contributions to the plurality of features in the training data. For example, there may be a contribution for each support vector. The processor 102 may share contribution of support vectors among features with a hypothesis as shown in equation 2 below $$g(x_k) = \sum_{i\in S} y_i\alpha_i K(x_i, x_k) + b = \sum_{i=0}^{d} f_k^i + b \qquad \text{Equation 2}$$

At step 208, the method includes determining, for each data point, a plurality of feature contributions by summing the plurality of support vector contributions of each feature, as shown in equation 3 below:

$$\sum_{i=0}^{d} w_{k,j}^i = 1 \forall\, k, j \qquad \text{Equation 3}$$

In the above equation 3, the variable $$'w_{k,j}^{i\prime},$$

may help in determining how feature 'i' influences the contribution of support vector 'j' for data point 'k'.

To determine $$'w_{k,j}^{i\prime},$$

the processor 102 may use kernel with dot product (Scenario 1).

Scenario 1 corresponds to kernel with dot product using below equations 4A, 4B, 4C, 4D and 4E.

$$C_k^j = y_j\alpha_j K(x_j, x_k) = y_j\alpha_j(\gamma\langle x_j, x_k\rangle + r)^d \qquad \text{Equation 4A}$$

$$C_k^j = y_j\alpha_j K(x_j, x_k) = y_j\alpha_j \tanh(\gamma\langle x_j, x_k\rangle + r) \qquad \text{Equation 4B}$$

$$K(x_j, x_k) \propto F(\langle x_j, x_k\rangle), F(x) = (\gamma x + r)^d (\text{or}) \tanh(\gamma x + r) \qquad \text{Equation 4C}$$

-continued

Say $x_j =$ \hfill Equation 4D $$(x_j[0], x_j[1], \ldots, x_j[d]) \text{ and } x_k = (x_k[0], x_k[1], \ldots, x_k[d])$$

$$\langle x_j, x_k\rangle = \qquad \text{Equation 4E}$$

$$x_j[0]x_k[0] + x_j[1]x_k[1] + \ldots + x_j[d]x_k[d] = \sum_{i=0}^{d} x_j[i]x_k[i]$$

Hence, $w_{k,j}^i \propto x_j[i]x_k[i]$ if $F(x) = x$

Problem : $G(x)$ such that $F(\langle x_j, x_k\rangle) =$ $$F\left(\sum_{i=0}^{d} x_j[i]x_k[i]\right) \approx c\sum_{i=0}^{d} G(x_j[i]x_k[i]).$$

Further, the processor 102 may validate with linear kernel. For example, considering 2 class 2d datasets and SVM model with linear kernel, the decision boundary may be arrived at for example, in a graph, represented by $-3.21645049x-\mathbf{1.66384228}y+0.01919655=0$.

Accordingly, from the above example, for new data $(x, y)$, the processor 102 may calculate decision function (e.g., $-3.21645049x-1.66384228y+0.01919655$) using SVM model 108 with linear kernel. Feature contribution from the hyperplane may be $[-3.21645049x, -1.66384228y]$. Feature contribution from using the system 100 may be $[f^x, f^y]$. In another example, the processor 102 may determine $$'w_{k,j}^{i\prime}$$

for sigmoid and polynomial kernel using below equations 5A and 5B:

Problem:

$G(x)$ such that $F(\langle x_j, x_k\rangle) =$ \hfill Equation 5A $$F\left(\sum_{i=0}^{d} x_j[i]x_k[i]\right)s \approx c\sum_{i=0}^{d} G(x_j[i]x_k[i]).$$

Sub−scenario 1: $F(x) = (\gamma x + r)^{d\prime\prime}$ $$G(x) = \left(x + \frac{r}{\gamma}\right)^{d\prime\prime} \therefore \left(\gamma\sum_{i=0}^{d} x_i + r\right)^{d\prime\prime} \approx c\sum_{i=0}^{d}\left(x_i + \frac{r}{\gamma}\right)^{d\prime\prime}$$

Sub−scenario 2: $F(x) = \tanh(\gamma x + r)$ \hfill Equation 5B $$G(x) = \tanh\left(x + \frac{r}{\gamma}\right) \therefore \tanh\left(\gamma\sum_{i=0}^{d} x_i + r\right) \approx c\sum_{i=0}^{d}\tanh\left(x_i + \frac{r}{\gamma}\right)$$

Hence, $w_{k,j}^i \propto G(x_j[i]x_k[i])$

Further, the processor 102 may determine $$'w_{k,j}^{i\prime}$$

for RBF kernel using below equations 6A and 6B:

Scenario 2. *RBF* kernel.

$$C_k^j = y_j\alpha_j K(x_j, x_k) = y_j\alpha_j\exp(-\gamma\|x_j - x_k\|2) \qquad \text{Equation 6A}$$

Say $x_j = (x_j[0], x_j[1], \ldots, x_j[d])$ and $x_k = (x_k[0], x_k[1], \ldots, x_k[d])$ -continued $$K(x_j, x_k) =$$

Equation 6B $$\exp\left(-\gamma \sum\nolimits_{i=0}^{d}(x_j[i] - x_k[i])^2\right) \approx c \sum\nolimits_{i=0}^{d} \frac{1}{\gamma(x_j[i] - x_k[i])^2 + 1}, \ldots$$

$c$ is any constant

Hence, $w_{k,j}^i \propto \dfrac{1}{\gamma(|x_j[i] - x_k[i]|)^2 + 1}$

Figure 2B:
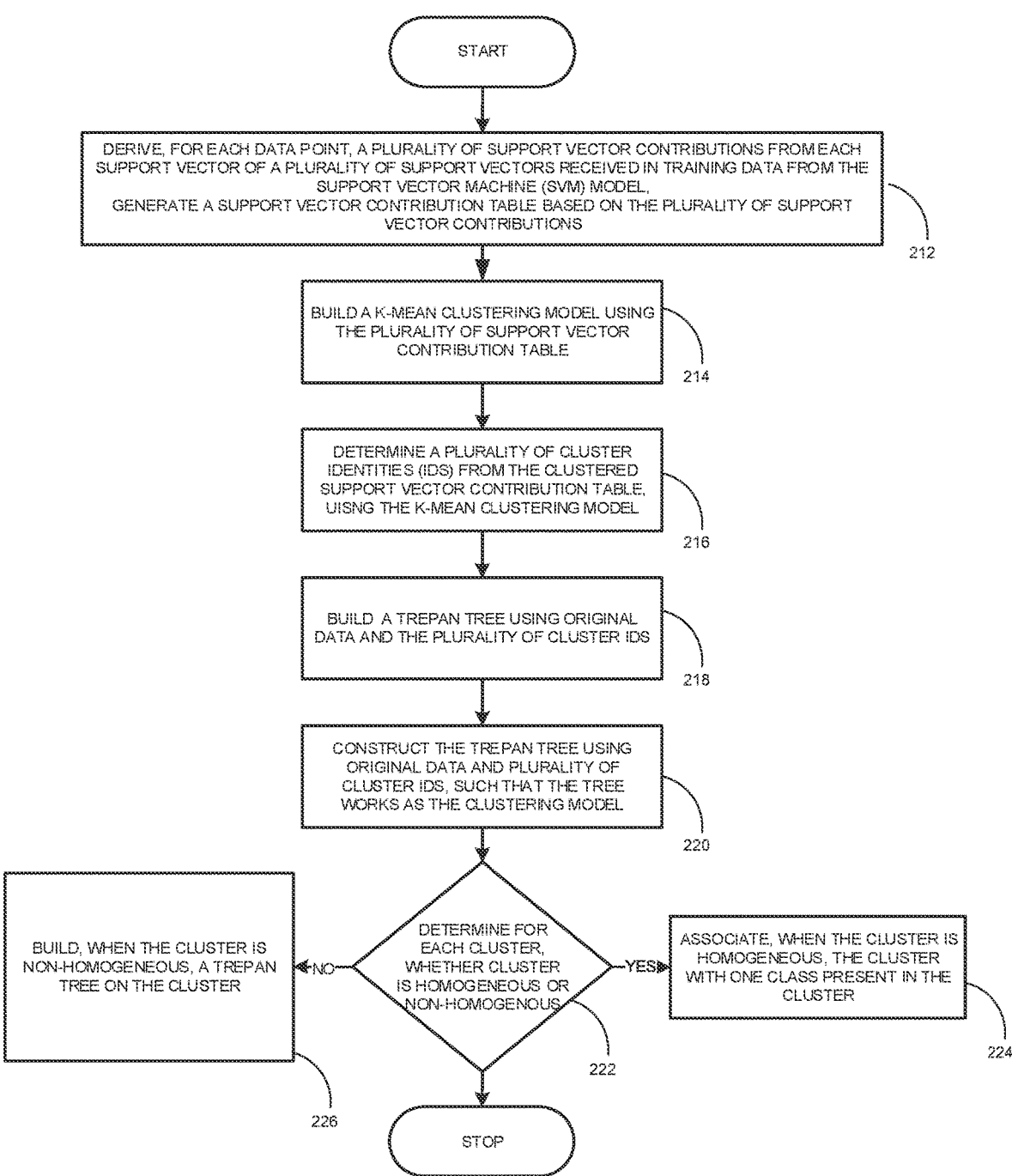
FIG. 2B illustrates an example flow diagram of a method for providing human-interpretable reason codes using a trepan tree for Support Vector Machine (SVM), according to an example embodiment of the present disclosure.

FIG. 2B illustrates an example flow diagram of a method for providing human-interpretable reason codes using a trepan tree for Support Vector Machine (SVM), according to an example embodiment of the present disclosure.

At step 212, the method includes deriving, for each data point, a plurality of support vector contributions from each support vector of a plurality of support vectors received in the training data from the Support Vector Machine (SVM) model 108, and generating a support vector contribution table based on the plurality of support vector contributions. The support vector contributions may be derived using the equation 1 described above.

At step 214, the method includes building a k-mean clustering model using the plurality of the support vector contribution table. The clustering model may include at least one of k-means, DBscan, and the like. At step 216, the method includes determining a plurality of cluster Identities (IDs) from the clustered support vector contribution table, using the k-mean clustering model. At step 218, the method includes building a trepan tree using original data and the plurality of cluster IDS.

At step 220, the method includes constructing the trepan tree using original data and the plurality of cluster IDS, such that the tree works as the clustering model. At step 222, the method includes determining, for each cluster, whether the cluster is homogeneous or non-homogenous. At step 224, the method includes associating, when the cluster is homogeneous, the cluster with one class present in the cluster. At step 226, the method includes building, when the cluster is non-homogeneous, a trepan tree on the cluster. For example, let 'A' be the prediction class of the SVM model. If A' consists of identical values, then the corresponding cluster is homogeneous else non-homogeneous. For example, for A=[1,2,3,2,1,1,3,2], the corresponding cluster may be non-homogeneous, and for A=[1,1,1,1 1] the corresponding cluster may be homogeneous.

In an example embodiment, the processor 102 may obtain feedback from the user, when the user may not be satisfied with the human-interpretable reason codes provided by the system 100. The system 100 may use the feedback to train the human-interpretable reason code providing engine 106. For example, a set of human-interpretable reason codes may be presented to a sample user (i.e., entity, administrator, developer) during a "learning phase" or a "training phase" of the human-interpretable reason code providing engine 106. The correct human-interpretable reason codes may be provided, when the sample user may not be satisfied with the human-interpretable reason codes provided by the system 100.

Figure 2C:
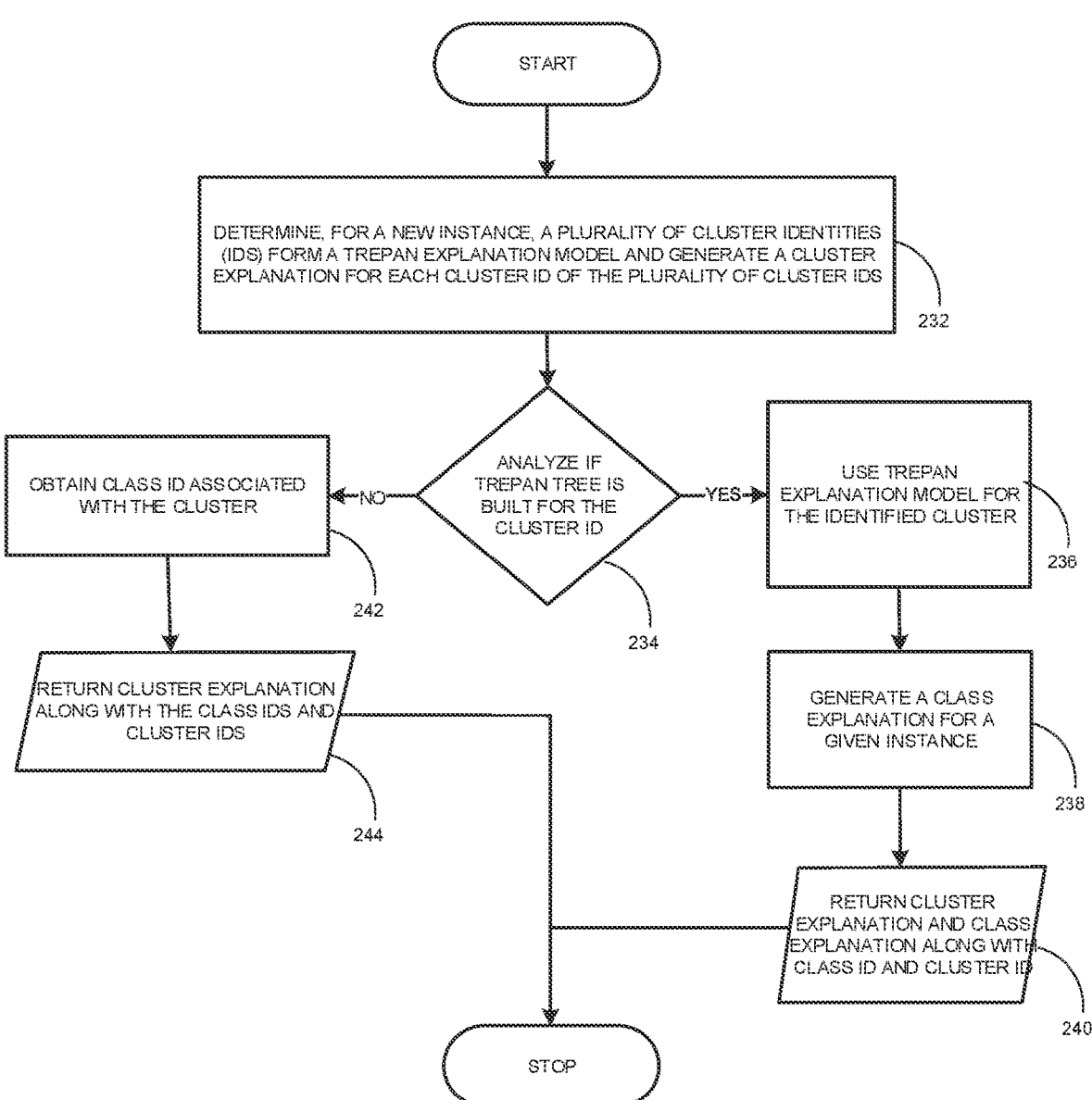
FIG. 2C illustrates an example flow diagram of a method for providing cluster Identities (IDs) and class IDs using a trepan tree, for interpretation from the Support Vector Machine (SVM), according to an example embodiment of the present disclosure.

FIG. 2C illustrates an example flow diagram of a method for providing cluster Identities (IDs) and class IDs using a trepan tree, for interpretation from the Support Vector Machine (SVM), according to an example embodiment of the present disclosure.

At step 232, the method includes determining, for a new instance in the training data, a plurality of cluster Identities (IDs) from a trepan explanation model and generating a cluster explanation for each clusterID of the plurality of cluster !Ds. New instance in the training data may correspond to a data point in training data. At step 234, the method includes analyzing if a trepan tree is built for the cluster ID. At step 236, the method includes using the trepan explanation model for the identified cluster. At step 238, the method includes generating a class explanation for a given instance in the training data.

At step 240, the method includes returning cluster explanation and class explanation along with class ID and cluster ID. At step 242, the method includes obtaining a class ID associated with the cluster. At step 244, the method includes returning cluster explanation along with the class IDs and cluster IDs.

FIG. 2D illustrates an example flow diagram of a method for providing human-interpretable reason codes using a decision tree for Support Vector Machine (SVM), according to an example embodiment of the present disclosure.

At step 252, the method includes retrieving training data and the trained Support Vector Machine (SVM) model. At step 254, the method includes deriving a plurality of support vector contributions from each support vector of a plurality of support vectors received in training data from the Support Vector Machine (SVM) model. The plurality of support vector contributions may be derived using the equation described above. At step 256, the method includes building a k-mean clustering model using the plurality of support vector contributions and generating cluster IDs.

At step 258, the method includes training a decision tree with original data and cluster ID. At step 260, the method includes determining a plurality of cluster Identities (IDs) from the decision tree. At step 262, the method includes obtaining, for each cluster a plurality of decision function values of the cluster from the SVM model and building a regression decision tree to predict a decision function value.

Figure 2E:
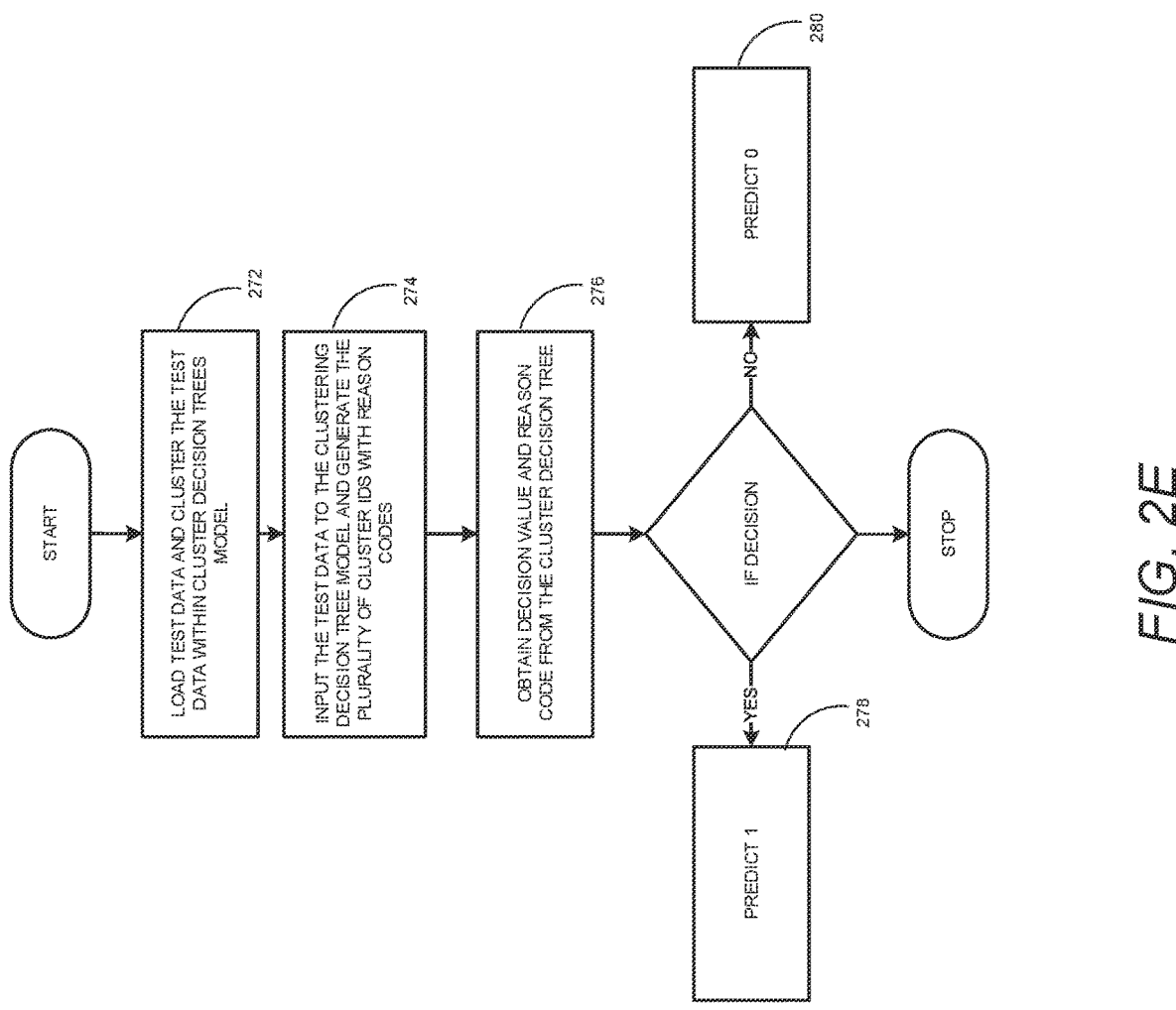
FIG. 2E illustrates an example flow diagram of a method for providing cluster Identities (IDs) and class IDs using a decision tree, for interpretation from the Support Vector Machine (SVM), according to an example embodiment of the present disclosure, FIG. 3 A illustrates an exemplary scenario for providing human-interpretable reason codes using a trepan tree for an Ensemble algorithm, according to an example embodiment of the present disclosure.

FIG. 2E illustrates an example flow diagram of a method for providing cluster Identities (IDs) and class IDs using a decision tree, for interpretation from the Support Vector Machine (SVM), according to an example embodiment of the present disclosure, At step 272, the method includes load test data and clustering the test data within a cluster decision trees model. At step 274, the method includes providing as an input, the test data to the clustering decision tree model and generating the plurality of cluster IDs with reason codes. At step 276, the method includes obtaining decision value and reason code from the cluster decision tree. At step 278, the method includes predicting 1 when the decision value is greater than 0. At step 280, the method includes predicting '0', when the decision value is not greater than '0'. For example, if decision value is greater than '0' then the data corresponds to 'class 1' else 'class 0'.

Figure 3A:
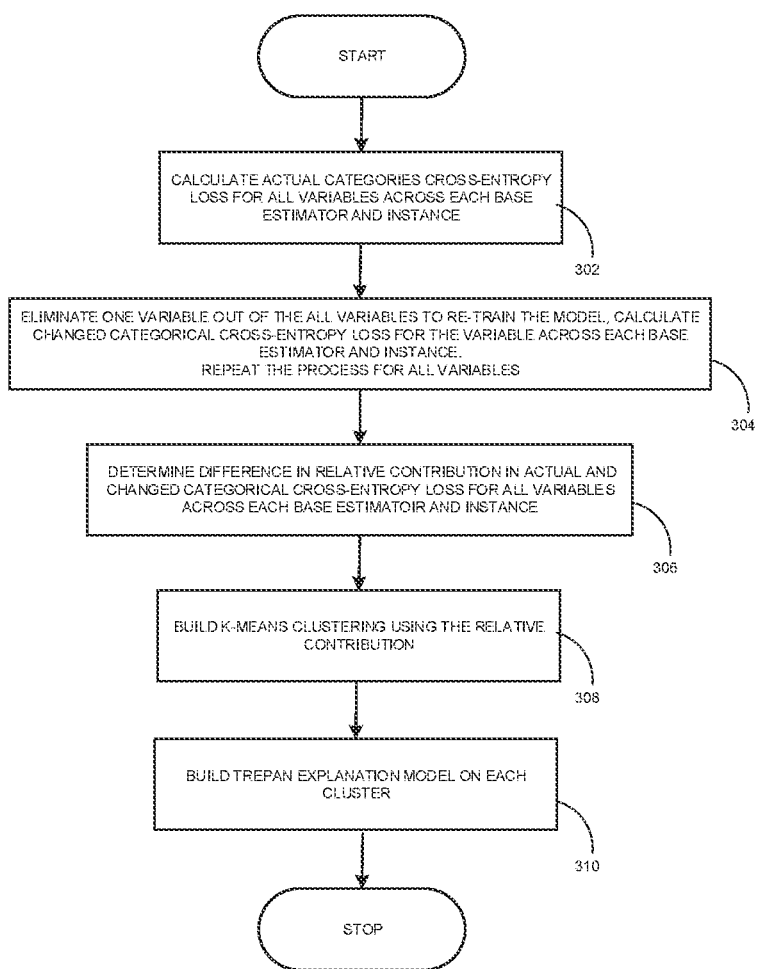
FIG. 3B illustrates an exemplary scenario for an interpretation of data points using a trepan tree for a trained black-box model, according to an example embodiment of the present disclosure.

FIG. 3A illustrates an exemplary scenario for providing human-interpretable reason codes using a trepan tree for an Ensemble algorithm, according to an example embodiment of the present disclosure.

At step 302, the method includes calculating overall categorical cross-entropy loss for all variables across each base estimator and instance. At step 304, the method includes eliminating one variable out of the all variables to re-train the model, and calculate changed categorical cross-entropy loss for the variable across each base estimator and instance. This step may be repeated for all variables. At step 306, the method includes determining the difference in relative contribution in overall and changed categorical cross-entropy loss for all variables across each base estimator and instance. At step 308, the method includes building k-means clustering using the relative contribution. At step 310, the method includes building a trepan explanation model for each cluster.

Figure 3B:
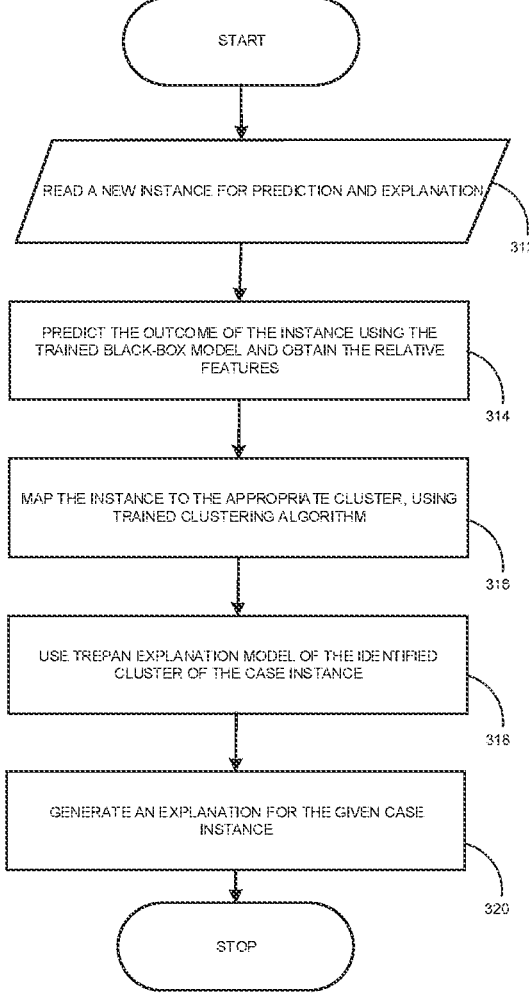

FIG. 3B illustrates an exemplary scenario for an interpretation of data points using a trepan tree for a trained black-box model, according to an example embodiment of the present disclosure.

Figure 4:
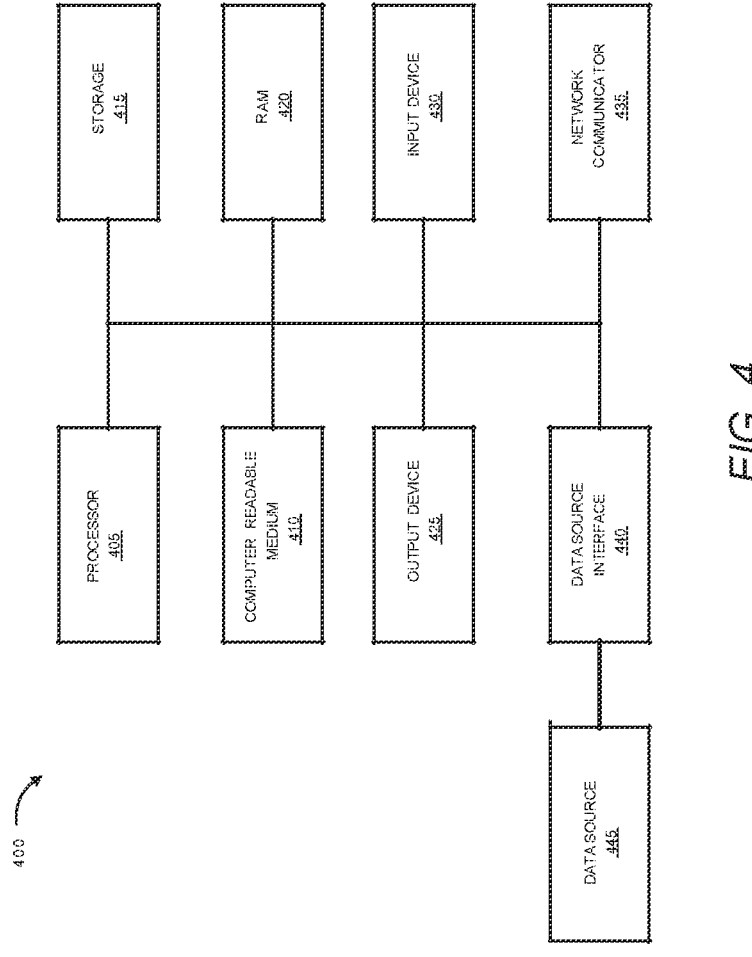
FIG. 4 illustrates a hardware platform for an implementation of the disclosed system, according to an example embodiment of the present disclosure.

At step 312, the method includes reading a new instance for prediction and explanation. At step 314, the method includes predicting the outcome of the instance using the trained black-box model and obtaining the relative features. At step 316, the method includes mapping the instance to the appropriate cluster, using a trained clustering algorithm. At step 318, the method includes using a trepan explanation model of the identified cluster for the instance in the training data. The instance in the training data may correspond to a data point in the training data. At step 320, the method includes generating an explanation for the given case instance, FIG. 4 illustrates a hardware platform 400 for implementation of the disclosed system 100, according to an example embodiment of the present disclosure. For the sake of brevity, the construction, and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 400. As illustrated, the hardware platform 400 may include additional components not shown, and some of the components described may be removed and/or modified. For example, a computer system with multiple GPIs may be located on external-cloud platforms including Amazon Web Services, or internal corporate cloud computing clusters, or organizational computing resources.

The hardware platform 400 may be a computer system such as the system 100 that may be used with the embodiments described herein. The computer system may represent a computational platform that includes components that may be in a server or another computer system. The computer system may execute, by the processor 405 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 405 that executes software instructions or code stored on a non-transitory computer-readable storage medium 410 to perform methods of the present disclosure. The software code includes, for example, instructions to gather data and documents and analyze documents. In an example, the CVAP 104, lead prioritization engine 110, RTME 114, may be software codes or components performing these steps.

The instructions on the computer-readable storage medium 410 are read and stored the instructions in storage 415 or in random access memory (RAM). The storage 415 may provide a space for keeping static data where at least some instructions could be stored for later execution. The stored instructions may be further compiled to generate other representations of the instructions and dynamically stored in the RAM such as RAM 420. The processor 405 may read instructions from the RAM 420 and perform actions as instructed.

The computer system may further include the output device 425 to provide at least some of the results of the execution as output including, but not limited to, visual information to users, such as external agents. The output device 425 may include a display on computing devices and virtual reality glasses. For example, the display may be a mobile phone screen or a laptop screen. GUIs and/or text may be presented as an output on the display screen. The computer system may further include an input device 430 to provide a user or another device with mechanisms for entering data and/or otherwise interact with the computer system. The input device 430 may include, for example, a keyboard, a keypad, a mouse, or a touchscreen. Each of these output devices 425 and input device 430 may be joined by one or more additional peripherals. For example, the output device 425 may be used to display the results such as bot responses by the executable chatbot.

A network communicator 435 may be provided to connect the computer system to a network and in turn to other devices connected to the network including other clients, servers, data stores, and interfaces, for example. A network communicator 435 may include, for example, a network adapter such as a LAN adapter or a wireless adapter. The computer system may include a data sources interface 440 to access the data source 445. The data source 445 may be an information resource. As an example, a database of exceptions and rules may be provided as the data source 445. Moreover, knowledge repositories and curated data may be other examples of the data source 445.

Figure 5:
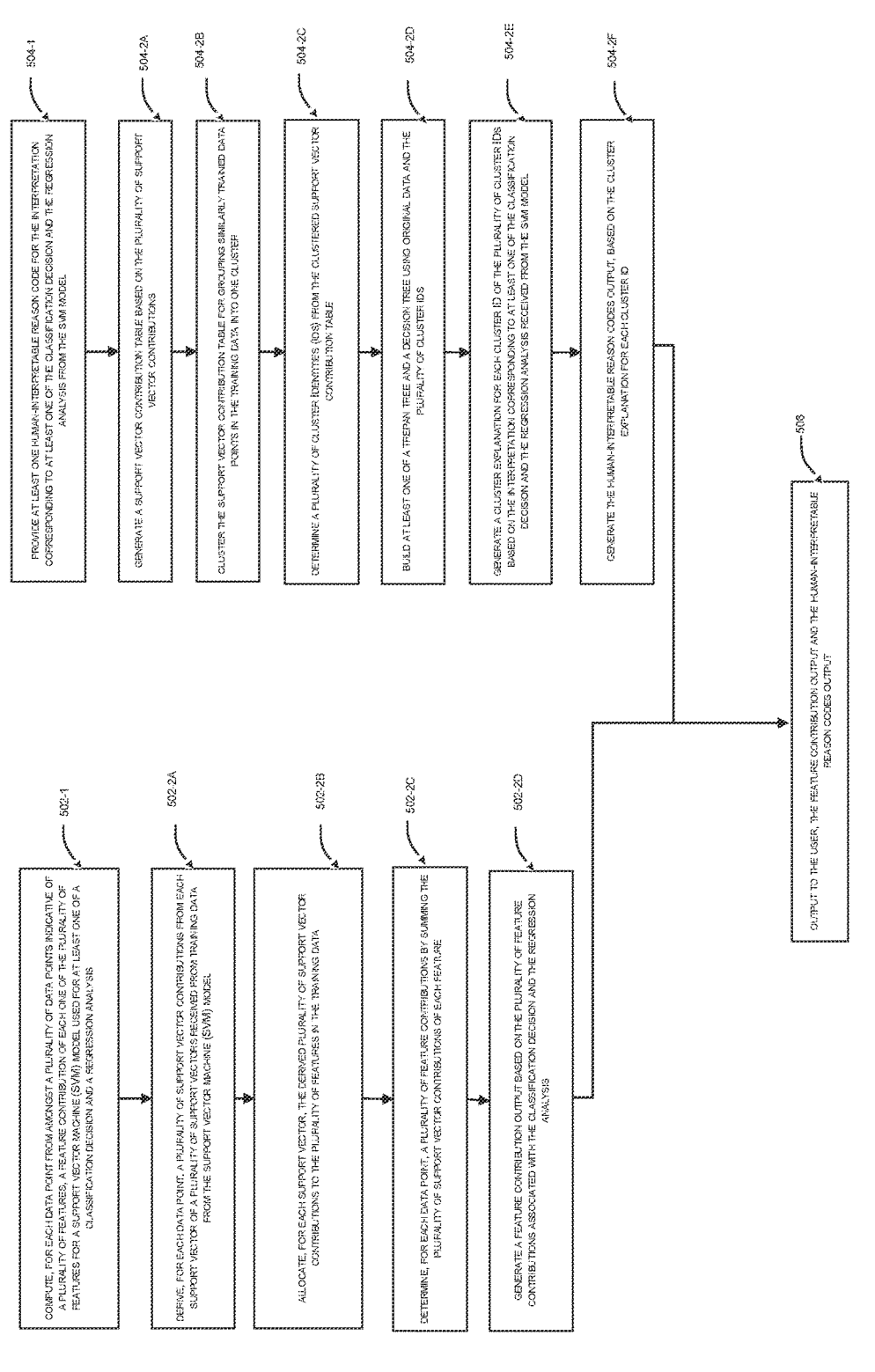
FIG. 5 illustrates a flow chart depicting a method of computing feature contribution and providing human-interpretable reason codes for the Support Vector Machine (SVM), according to an example embodiment of the present disclosure.

FIG. 5 illustrates a flow diagram depicting method 500 of computing feature contribution and providing human-interpretable reason codes for a Support Vector Machine (SVM) model 108, according to an example embodiment of the present disclosure.

At block 502-1, the method 500 may include computing, by the processor 102 associated with the system 100, for each data point from amongst a plurality of data points indicative of a plurality of features, a feature contribution of each one of the plurality of features for a Support Vector Machine (SVM) model 108 used for at least one of a classification decision and a regression analysis.

For computing the feature contribution, at block 502-2A, the method 500 may include deriving, by the processor 102, for each data point, a plurality of support vector contributions from each support vector of a plurality of support vectors received from training data from the Support Vector Machine (SVM) model 108. At block 502-2B, the method 500 may include allocating, by the processor 102, for each support vector, the derived plurality of support vector contributions to the plurality of features in the training data. At block 502-2C, the method 500 may include determining, by the processor, for each data point, a plurality of feature contributions by summing the plurality of support vector contributions of each feature. The plurality of features influences the contribution of the plurality of support vector contributions. At block 502-2D, the method 500 may include generating, by the processor 102, a feature contribution output based on the plurality of feature contributions associated with the classification decision and the regression analysis.

At block 504-1, the method 500 may include providing, by the processor 102, at least one human-interpretable reason code for the interpretation corresponding to at least one of, the classification decision and the regression analysis from the SVM model 108.

For providing at least one human-interpretable reason code, at block 504-2A, the method 500 may include generating, by the processor 102, a support vector contribution table based on the plurality of support vector contributions. At block 504-2B, the method 500 may include clustering, by the processor 102, the support vector contribution table for grouping similarly trained data points in the training data into one cluster. At block 504-2C, the method 500 may include determining, by the processor 102, a plurality of cluster Identities (IDs) from the clustered support vector contribution table. At block 504-2D, the method 500 may include building, by the processor 102, at least one of, a trepan tree or a decision tree using original data and the plurality of cluster IDs. At block 504-2E, the method 500 may include generating, by the processor 102, a cluster explanation for each cluster ID of the plurality of cluster IDs, based on the interpretation corresponding to at least one of the classification decisions and the regression analysis received from the SVM model 108. At block 504-2F, the method 500 may include generating, by the processor 102, the human-interpretable reason codes output, based on the cluster explanation for each cluster ID.

At block 506, the method 500 may include outputting, by the processor 102, to the user, the feature contribution output, and the human-interpretable reason codes output, wherein the feature contribution output and the human-interpretable reason codes output are indicative of an acceptable decision to be taken by the user based on the classification decision and the regression analysis received from the SVM model.

The order in which the method 500 is described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein. Furthermore, the method 500 may be implemented in any suitable hardware, software, firmware, or a combination thereof, that exists in the related art or that is later developed. The method 500 describes, without limitation, the implementation of the system 100. A person of skill in the art will understand that method 500 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;
a memory coupled to the processor, wherein the memory comprises processor-executable instructions, which on execution, cause the processor to:

compute, for each data point from amongst a plurality of data points that are indicative of a plurality of features, a feature contribution of each one of the plurality of features for a Support Vector Machine (SVM) model used for at least one of a classification decision and a regression analysis, wherein, for computing the feature contribution, the processor is configured to:
derive, for each data point, a plurality of support vector contributions from each support vector of a plurality of support vectors received from training data from the Support Vector Machine (SVM) model;
allocate, for each support vector, the derived plurality of support vector contributions to the plurality of features in the training data;
determine, for each data point, a plurality of feature contributions by summing the plurality of support vector contributions of each feature, wherein the plurality of features influence contribution of the plurality of support vector contributions; and
generate a feature contribution output based on the plurality of feature contributions associated with the classification decision and the regression analysis;
provide at least one human-interpretable reason code for an interpretation corresponds to at least one of, the classification decision and the regression analysis from the SVM model, wherein, for providing the plurality of human-interpretable reason codes, the processor is configured to;
generate a support vector contribution table based on the plurality of support vector contributions;
cluster the support vector contribution table for grouping similarly trained of data points in the training data into one cluster;
determine a plurality of cluster Identities (IDs) from the clustered support vector contribution table;
build at least one of a trepan tree or a decision tree using original data and the plurality of cluster IDs, wherein the original data includes unscaled training data;
generate a cluster explanation for each cluster ID of the plurality of cluster IDs based on the interpretation corresponds to at least one of the classification decision and the regression analysis received from the SVM model; and
generate the human-interpretable reason codes output, via the trepan tree or decision tree, based on the cluster explanation for each cluster ID; and
generate the human-interpretable reason codes output, wherein the human-interpretable reason codes output is derived from the cluster explanation for each cluster ID through the trepan tree or decision tree; and
output to the user, the feature contribution output and the human-interpretable reason codes output, wherein the feature contribution output and the human-interpretable reason codes output are indicative of an acceptable decision to be taken by the user based on the classification decision and the regression analysis received from the SVM model.

2. The system as claimed in claim 1, wherein, for building at least one of the trepan tree or the decision tree using the original data and the plurality of cluster IDs, the processor is further configured to:
generate the plurality of cluster IDs with a reason code associated with each cluster ID; and
construct using at least one of the trepan tree or the decision tree, a plurality of clusters, based on the plurality of cluster IDs comprising the reason code.

3. The system as claimed in claim 2, wherein the processor is further configured to:

analyze, for each cluster, a plurality of distributions in a plurality of classes associated with the plurality of clusters, and determine whether a class of the plurality of classes is homogeneous or non-homogenous, when the plurality of clusters is constructed using the trepan tree; and obtain, for each cluster, a plurality of decision function values from the SVM model to predict a decision function value using a regression decision tree, when the plurality of clusters is constructed using the decision tree.

4. The system as claimed in claim 3, wherein, the processor is further configured to:

associate, when the class of the plurality of classes is homogeneous, the cluster with one class present in the cluster; and build, when the class of the plurality of classes is non-homogeneous, another trepan tree on the cluster associated with the class which is non-homogeneous to generate a class.

5. The system as claimed in claim 4, wherein the processor is further configured to:

build, when there are 'n' clusters with 'k' homogeneous clusters, n-k trepan tree for each non-homogenous cluster, and one trepan tree for constructing the plurality of clusters.

6. The system as claimed in claim 1, wherein the interpretation from the SVM model is input, by the processor, to the trepan tree to generate the plurality of cluster IDs with reason codes, and the plurality of cluster IDs with reason codes are input to the trepan tree to analyze if the trepan tree is built for the cluster ID.

7. The system as claimed in claim 6, wherein, if the trepan tree is not built for the cluster ID, then the reason codes are returned, by the processor, as output along with the class IDs, wherein, if the trepan tree is built for the cluster ID, then the interpretation from the SVM is input, by the processor, to the trepan tree associated with the cluster ID to generate, by the processor, another set of reason codes along with the class ID.

8. The system as claimed in claim 1, wherein the interpretation from the SVM model is input, by the processor, to the decision tree to generate the plurality of cluster IDs with reason codes, and the plurality of cluster IDs with reason codes is input to a regression decision tree associated with the cluster ID to generate another set of reason codes with the class ID.

9. The system as claimed in claim 1, wherein the derived plurality of support vector contributions to the plurality of features in the training data are allocated, by the processor, for each support vector, so that the features comprising a positive weight contribution are provided with higher feature contribution values and the features comprising a negative weight contribution are provided with lower feature contribution values.

10. A method comprising:

computing, by a processor associated with a system, for each data point from amongst a plurality of data points that are indicative of a plurality of features, a feature contribution of each one of the plurality of features for a Support Vector Machine (SVM) model used for at least one of a classification decision or a regression analysis, wherein computing the feature contribution comprises:

deriving, by the processor, for each data point, a plurality of support vector contributions from each support vector of a plurality of support vectors received from training data from the Support Vector Machine (SVM) model;

allocating, by the processor, for each support vector, the derived plurality of support vector contributions to the plurality of features in the training data;

determining, by the processor, for each data point, a plurality of feature contributions by summing the plurality of support vector contributions of each feature, wherein the plurality of features influence contribution of the plurality of support vector contributions; and generating, by the processor, a feature contribution output based on the plurality of feature contributions associated with the classification decision and the regression analysis;

providing, by the processor, at least one human-interpretable reason code for an interpretation corresponding to at least one of the classification decision and the regression analysis from the SVM model, wherein providing the plurality of human-interpretable reason codes, comprises:

generating, by the processor, a support vector contribution table based on the plurality of support vector contributions;

clustering, by the processor, the support vector contribution table for grouping similarly trained data points in the training data into one cluster;

determining, by the processor, a plurality of cluster Identities (IDs) from the clustered support vector contribution table;

building, by the processor, at least one of a trepan tree or a decision tree using original data and the plurality of cluster IDs, wherein the original data includes unscaled training data;

generating, by the processor, a cluster explanation for each cluster ID of the plurality of cluster IDs, based on the interpretation corresponds to at least one of the classification decision and the regression analysis received from the SVM model; and generating, by the processor, the human-interpretable reason codes output, via the trepan tree or decision tree, based on the cluster explanation for each cluster ID; and outputting, by the processor, to the user, the feature contribution output, and the human-interpretable reason codes output, wherein the feature contribution output and the human-interpretable reason codes output are indicative of an acceptable decision to be taken by the user based on the classification decision and the regression analysis received from the SVM model.

11. The method as claimed in claim 10, wherein building at least one of the trepan tree or the decision tree using the original data and the plurality of cluster IDs further comprises;

generating, by the processor, the plurality of cluster IDs with a reason code associated with each cluster ID; and constructing, by the processor, using at least one of the trepan tree or the decision tree, a plurality of clusters, based on the plurality of cluster IDs comprising the reason code.

12. The method as claimed in claim 11 further comprises:

analyze, by the processor, for each cluster, a plurality of distributions in a plurality of classes associated with the plurality of clusters, and determine, whether a class of the plurality of classes is homogeneous or non-homogenous, when the plurality of clusters is constructed using the trepan tree; and obtaining, by the processor, for each cluster, a plurality of decision function values from the SVM model to predict a decision function value using a regression decision tree, when the plurality of clusters is constructed using the decision tree.

13. The method as claimed in claim 12 further comprises:

associating, by the processor, when the class of the plurality of classes is homogeneous, the cluster with one class present in the cluster; and building, by the processor, when the class of the plurality of classes is non- homogeneous, another trepan tree on the cluster associated with the class which is non-homogeneous to generate a class.

14. The method as claimed in claim 13 further comprises:

building, by the processor, when there are 'n' clusters with 'k' homogeneous clusters, n-k trepan tree for each non-homogenous cluster, and one trepan tree for constructing the plurality of clusters.

15. The method as claimed in claim 10, wherein the interpretation from the SVM model is input, by the processor, to the trepan tree to generate the plurality of cluster IDs with reason codes, and the plurality of cluster IDs with reason codes are input to the trepan tree to analyze if the trepan tree is built for the cluster ID.

16. The method as claimed in claim 15, wherein, if the trepan tree is not built for the cluster ID, then the reason codes are returned, by the processor, as output along with the class IDs, and wherein, if the trepan tree is built for the cluster ID, then the interpretation from the SVM is input, by the processor, to the trepan tree associated with the cluster ID to generate, by the processor, another set of reason codes along with the class ID.

17. The method as claimed in claim 10, wherein the interpretation from the SVM model is input, by the processor, to the decision tree to generate the plurality of cluster IDs with reason codes, and the plurality of cluster IDs with reason codes is input to a regression decision tree associated with the cluster ID to generate another set of reason codes with the class ID.

18. The method as claimed in claim 10, wherein the derived plurality of support vector contributions to the plurality of features in the training data are allocated, by the processor, for each support vector, so that the features comprising a positive weight contribution are provided with higher feature contribution values and the features comprising a negative weight contribution are provided with lower feature contribution values.

19. A non-transitory computer-readable medium comprising machine-readable instructions that are executable by a processor to:

compute, for each data point from amongst a plurality of data points indicative of a plurality of features, a feature contribution of each one of the plurality of features for a Support Vector Machine (SVM) model used for at least one of a classification decision and a regression analysis, wherein, for computing the feature contribution, the processor is configured to:

derive, for each data point, a plurality of support vector contributions from each support vector of a plurality of support vectors received from training data from the Support Vector Machine (SVM) model;

allocate, for each support vector, the derived plurality of support vector contributions to the plurality of features in the training data;

determine, for each data point, a plurality of feature contributions by summing the plurality of support vector contributions of each feature, wherein the plurality of features influence contribution of the plurality of support vector contributions; and generate a feature contribution output based on the plurality of feature contributions associated with the classification decision and the regression analysis;

provide at least one human-interpretable reason code for an interpretation corresponding to at least one of the classification decision and the regression analysis from the SVM model, wherein, for providing the plurality of human-interpretable reason codes, the processor is configured to:

generate a support vector contribution table based on the plurality of support vector contributions;

cluster the support vector contribution table for grouping similarly trained data points in the training data into one cluster;

determine a plurality of cluster Identities (IDs) from the clustered support vector contribution table;

build at least one of a trepan tree or a decision tree using original data and the plurality of cluster IDs, wherein the original data includes unscaled training data;

generate a cluster explanation for each cluster ID of the plurality of cluster IDs, based on the interpretation corresponds to at least one of the classification decision and the regression analysis-received from the SVM model; and generate the human-interpretable reason codes output, via the trepan tree or decision tree, based on the cluster explanation for each cluster ID; and output to the user, the feature contribution output, and the human-interpretable reason codes output, wherein the feature contribution output and the human-interpretable reason codes output are indicative of an acceptable decision to be taken by the user based on the classification decision and the regression analysis received from the SVM model.

20. The non-transitory computer-readable medium as claimed in claim 19, wherein, for building at least one of the trepan tree or the decision tree using the original data and the plurality of cluster IDs, the processor is further configured to:

generate the plurality of cluster IDs with a reason code associated with each cluster ID: and construct using at least one of the trepan tree or the decision tree, a plurality of clusters, based on the plurality of cluster IDs comprising the reason code.

* * * * *